Patented Oct. 1, 1929

1,729,893

UNITED STATES PATENT OFFICE

SAMUEL EDWIN OLIVER, OF GALVESTON, TEXAS

METHOD OF PRESERVING FRESH FRUIT

No Drawing. Application filed August 12, 1927. Serial No. 212,611.

This invention relates to a novel method of preserving fresh fruit.

One object of the invention is to provide a novel method whereby fruits, in raw state, may be preserved so that they will retain their freshness and flavor and will be protected against decay for a considerable length of time.

Another object of the invention resides in a novel method of preserving, by the use of which fruit, which is perishable, may be packed and kept in fresh condition so that it may be shipped and marketed and will reach the consumer in substantially as fresh a condition as when gathered and packed.

A further object of the invention resides in the provision of a novel method of preparing and packing fresh raw fruit which may be cheaply and easily carried out and by the use of which the fruit may be economically packed and kept in a fresh state for a sufficient length of time to permit the fruit to be shipped and disposed of.

With the above and other objects in view the invention has particular relation to a novel method, or process, of preserving fresh raw fruit more specifically hereinafter explained.

In carrying out the process the fresh fruit to be preserved is cleansed by any suitable method commonly employed. The method of cleaning the fruit, of course, will depend somewhat on the character of the fruit. The fruit is then thoroughly chilled, that is reduced to a temperature of approximately thirty-four degrees Fahrenheit. While being cooled the fruit should also be dried sufficiently to remove all moisture from the surface thereof.

Granulated sugar should be used in packing the fruit. This sugar should be clean and thoroughly chilled, that is reduced to a temperature of approximately thirty degrees Fahrenheit.

The fruit should be retained in said cool state until packed and the packing process should take place in a room at a temperature not above the temperature of the fruit.

In packing, the bottom of an air tight container should be covered with a layer of the sugar about one-half inch deep and the container should then be filled up with alternate layers of fruit and sugar until the container has been filled. The individual fruit, of each layer should be spaced from each other and from the container walls so that each individual will be isolated, that is, will not contact either with the container walls or with each other individual fruit, to the end that each individual fruit will be completely surrounded by the sugar. The container should then be closed and hermetically sealed.

There will be considerable dead air confined in the spaces between the grains of the sugar and the pack will have high thermal resistance; consequently the freshness of the fruit will be retained for a long period of time. Sugar has been found to be preferable as a packing for the fruit for the reason that it will not only prevent moulding of the fruit but will decompose any mould, or decaying matter on the fruit when packed.

Variations in carrying out the method herein described may be made within the principle as defined by the appended claims.

What I claim is:

1. The method of preserving fruit, in a raw state, which consists in chilling the fruit and packing the same, in chilled granulated sugar in a hermetically sealed container in such manner that the individuals, of the fruit, will be completely surrounded by the sugar.

2. The method of packing fruit which consists in reducing the temperature of the fruit to approximately thirty-four degrees Fahrenheit, then packing the same, in sugar having a temperature of approximately thirty degrees Fahrenheit, in a container, then hermetically sealing the container.

3. The method of packing fruit in sugar which consists in reducing the temperature of the fruit to approximately thirty-four degrees Fahrenheit, and reducing the temperature of the sugar to approximately thirty degrees Fahrenheit, then packing the fruit and sugar in a container in such manner as to isolate the individual fruit from each other and from the container walls, meanwhile maintaining said temperatures, then hermetically sealing the container.

4. The method of preserving fresh fruit which consists in chilling the fruit and then surrounding individual fruit in a container, with a chilled, granular, saccharine substance, then hermeticaly sealing the container.

In testimony whereof I have signed my name to this specification.

SAMUEL EDWIN OLIVER.